C. SCHWARZ.
PLANER CLAMP.
APPLICATION FILED JAN. 7, 1920.

1,372,459.

Patented Mar. 22, 1921.
3 SHEETS—SHEET 1.

Carl Schwarz
Inventor

By W. W. Williamson
Atty.

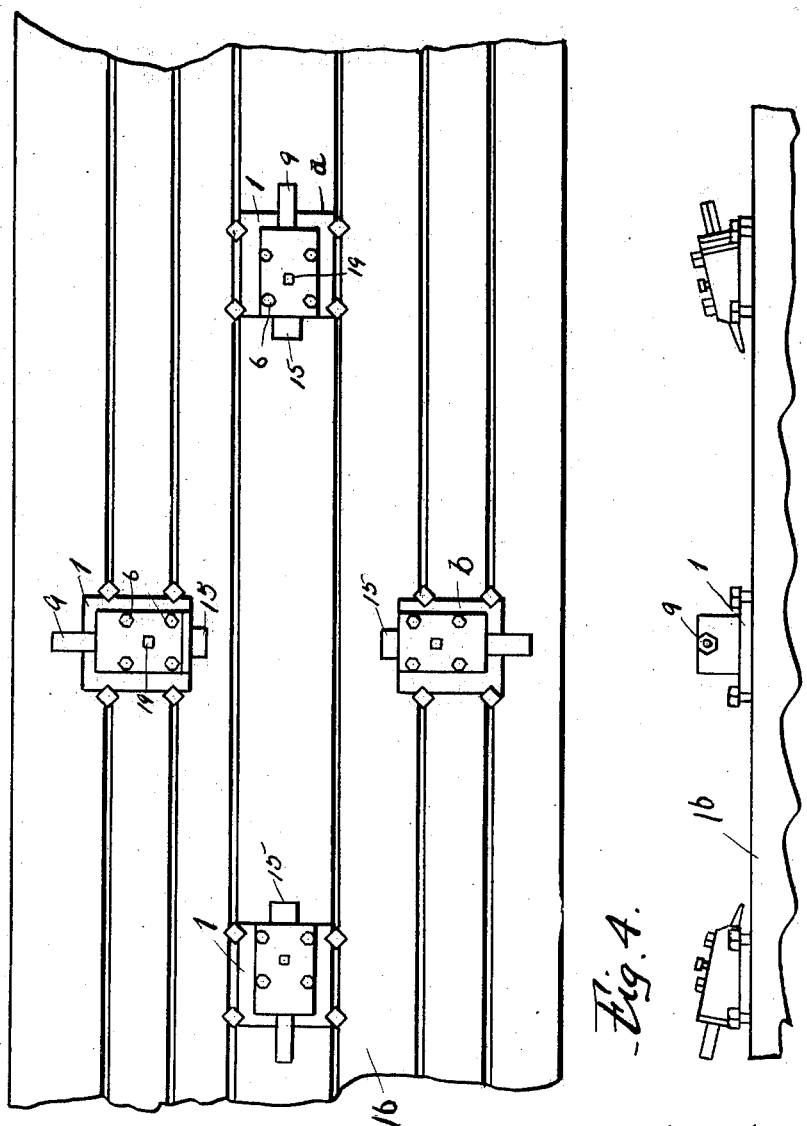

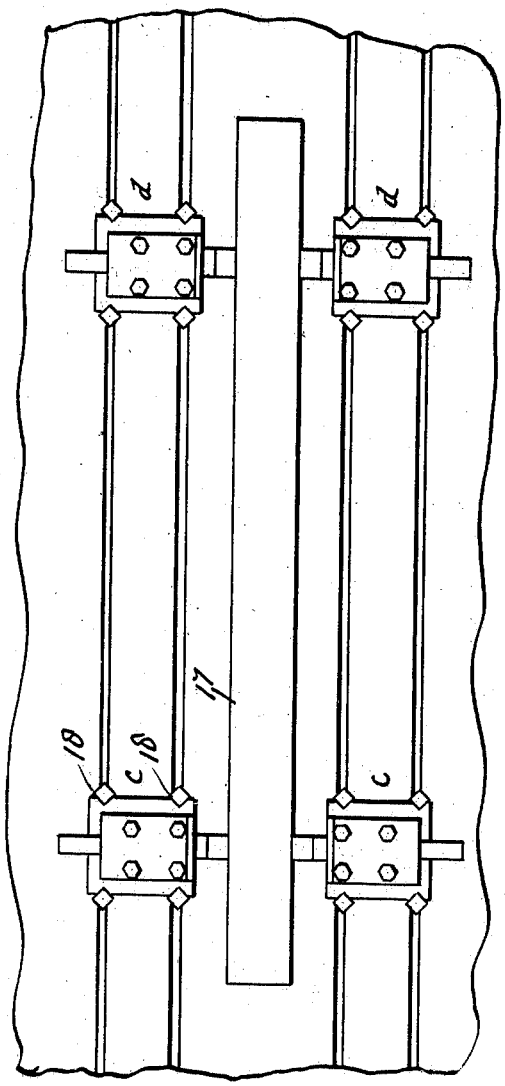
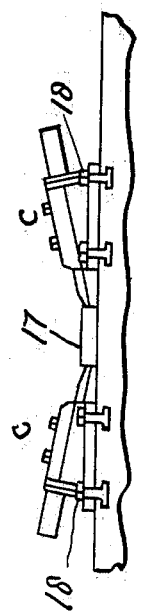

UNITED STATES PATENT OFFICE.

CARL SCHWARZ, OF PHILADELPHIA, PENNSYLVANIA.

PLANER-CLAMP.

1,372,459.

Specification of Letters Patent.

Patented Mar. 22, 1921.

Application filed January 7, 1920. Serial No. 349,919.

*To all whom it may concern:*

Be it known that I, CARL SCHWARZ, a citizen of the United States, residing at Philadelphia, in the county of Philadelphia and State of Pennsylvania, have invented new and useful Improvements in Planer-Clamps, of which the following is a specification.

My invention relates to a new and useful improvement in clamping devices for holding work upon the beds of planers, shapers or other machine tools, and has for its object to provide an exceedingly simple and effective device which may be readily secured to the bed of a planer or the like by means of which the work to be machined may be firmly clamped to said bed and readily removed therefrom when the machining operation has been completed.

A further object of my invention is to so construct a clamp of this description that it will force the article to be machined downward upon the machine bed during the process of clamping the article.

A still further object of my invention is to provide for setting the clamping bars against back lash after they have been adjusted to the work.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application in which:—

Fig. 3, is a plan view of a portion of a planer bed showing four of my improved clamps secured thereon in position to clamp an article upon said bed for machining.

Fig. 4, is a side elevation of a portion of Fig. 3.

Fig. 5, is a portion of a planer bed showing four of my improved clamps securing thereon in such manner as to adapt them for clamping a narrow thin piece of metal for planing.

Fig. 6, is an end view of Fig. 5.

Figure 1:
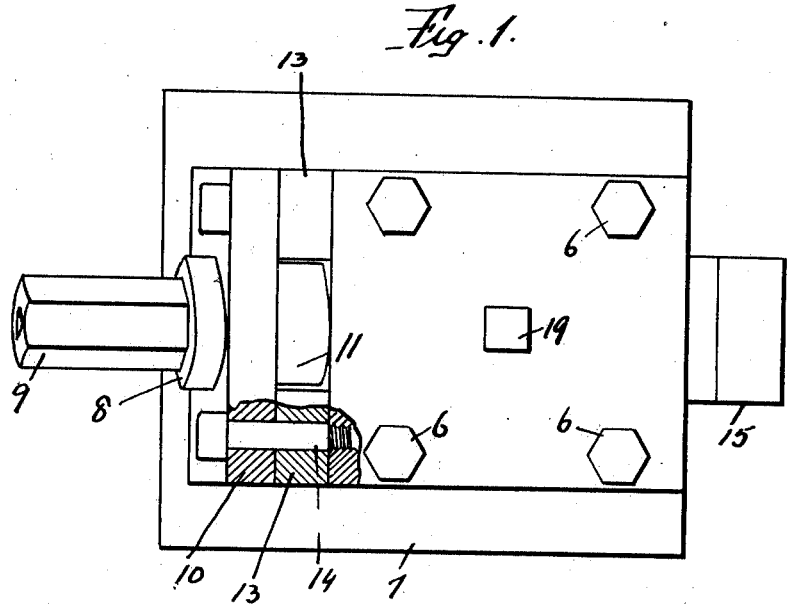
Figure 1, is a plan view of a clamp made in accordance with my improvement.
Figure 2:
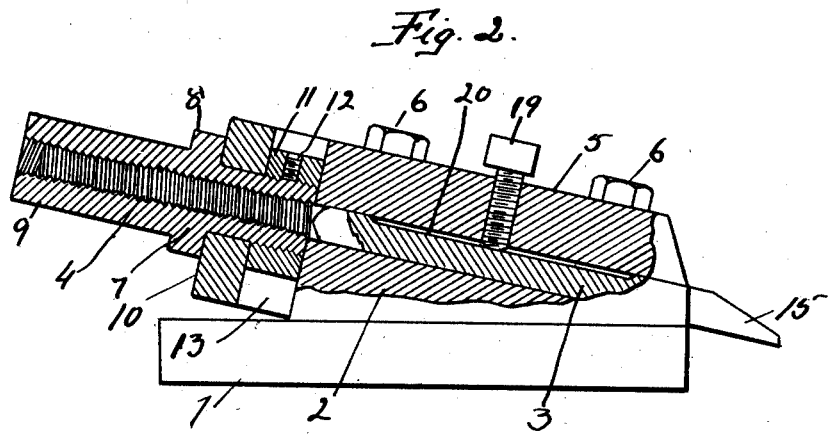
Fig. 2, is a cross section of Fig. 1 to clearly show the construction thereof.

In carrying out my invention as here embodied 1 represents the base of the clamp having an inclined section 2 formed therewith in which is guided the clamp bar 3 the latter carrying a threaded shank 4. This clamp bar is held in place upon the inclined section by the cap plate 5 secured in place by the bolts 6.

7 represents a barrel which is internally threaded to receive the threaded shank 4 and this barrel carries a collar 8 and also has formed therewith the wrench hold 9.

10 represents a plate through which the body of the barrel passes and is adapted to revolve therein the stationary collar 8 bearing upon one side of the plate while the removable collar 11 which is secured upon the barrel by the set screw 12 bears upon the other side of the plate.

13 represents two spacing blocks interposed between the plate 10 and the rear inclined section 2 for spacing the plate at the proper distance from the inclined section to provide for the accommodation of the collar 11 and these plate spacing blocks are secured to the inclined section 2 and the cap plate 5 by means of the bolts 14. From this description it will be seen that the clamp bar 3 may be forced forward or retracted by applying a wrench to the wrench hold 9 and revolving the barrel in the desired direction the forward end of the clamp bar being beveled so as to form a relatively thin nose 15 for contact with the object to be clamped upon a machine tool bed.

In practice two or more of these clamps are secured upon the machine bed as shown in Figs. 3 and 4 and indicated at *a*. Two of these clamps are set opposite each other crosswise of the planer bed 16 while two other such clamps are set opposite each other lengthwise of the bed as indicated at *b* and when so placed the article to be clamped to the bed for machining is placed between this clamp and the clamp bars of the latter are set up as before described until the noses thereof bind against the article and force it downward firmly against the bed plate while holding it against longitudinal and lateral movement.

When the machining operation has been completed a slight turning backward of the barrel of one of each set of the clamps will sufficiently free the noses of these particular clamps from the work to permit it to be removed. This will greatly facilitate the handling of duplicate pieces which are to be machined since the clamps do not have to be unset, and the positioning of the work upon the bed, and the clamping of the same thereto is greatly facilitated as each piece of work will be placed in the same position without calculation or resetting the tools for the adjustment of the planer.

My improved clamp is especially adapted for use in holding narrow thin pieces of metal upon the planer bed and the arrangement of the clamp for this class of work is shown in Figs. 5 and 6 in which two pairs of clamps are set opposite each other crosswise of the bed as indicated at $c$ and $d$. When the clamps are thus disposed a strip of metal such as indicated at 17 is readily clamped to the planer bed and securely held against the longitudinal or sidewise movement while being machined with the advantage of permitting the machining of the entire upper surface of the strip without resetting which has heretofore been necessary where ordinary clamps are used for holding the work in place. The bevel noses of the clamp bars prevent the interference of these clamp bars with the tool for machining the work as will be readily understood.

The base of each of the clamps is secured to the planer bed by means of the bolts 18 or in any other convenient manner.

19 represents a set bolt which is threaded through the cap plate 5 and the end of which passes into the depression 20 formed with the upper face of the clamp bar 3 longitudinally thereof and the purpose of this arrangement is to hold the clamp bar against retraction by vibration or jar when the nose thereof has been set against the work which is readily accomplished by screwing down upon the bolt 19, the depression serving to prevent the throwing of a bur which would interfere with the operation of the clamp bar.

Of course I do not wish to be limited to the exact details of construction as herein shown as these may be varied within the limits of the appended claims without departing from the spirit of my invention.

Having thus fully described my invention, what I claim as new and useful is:—

1. A clamp comprising a base, an inclined section carried by said base, a clamp bar fitted to slide upon said inclined section, said clamp bar having a longitudinal depression in the upper face thereof, a cap plate secured upon the inclined section so as to hold the clamp bar in place, a set bolt threaded through said cap plate the nose of said bolt entering said depression, and means for moving the clamp bar back and forth.

2. A clamp comprising a base, an inclined section carried by said base, a clamp bar fitted to slide upon said inclined section, said clamp bar having a longitudinal depression in the upper face thereof, a cap plate secured upon the inclined section so as to hold the clamp bar in place, a set bolt threaded through said cap plate the nose of said bolt entering said depression, a threaded shank formed with the clamp bar, and an internally threaded barrel into which said shank passes.

3. A clamp of the character described consisting of a base, an inclined section carried by said base, a clamp bar fitted to slide upon said inclined section, a cap plate secured upon said section for holding the clamp bar in position, a threaded shank formed with the clamp bar, a barrel threaded upon said shank, a stationary collar formed with said barrel, a removable collar secured upon said barrel, a plate secured to the rear of the inclined section against which said collar bears, and a wrench hold formed with the barrel for actuating the device.

In testimony whereof, I have hereunto affixed my signature.

CARL SCHWARZ.